US005709725A

United States Patent [19]

Imashita

[11] Patent Number: 5,709,725
[45] Date of Patent: Jan. 20, 1998

[54] PROCESS FOR PRODUCING A GLASS MELT

[75] Inventor: Katsuhiro Imashita, Shibuya-Ku, Japan

[73] Assignee: Kirin Beer Kabushiki Kaisha, Tokyo, Japan

[21] Appl. No.: 539,702

[22] Filed: Oct. 5, 1995

[30] Foreign Application Priority Data

Oct. 6, 1994 [JP] Japan .................. 6-242845

[51] Int. Cl.$^6$ .................. C03C 1/00; C03C 6/06
[52] U.S. Cl. .................. 65/134.3; 65/17.1; 65/135.9; 501/30
[58] Field of Search .................. 65/17.1, 134.3, 65/135.9; 501/30, 43, 44, 54, 55, 56, 57

[56] References Cited

U.S. PATENT DOCUMENTS

| | | | |
|---|---|---|---|
| 3,779,733 | 12/1973 | Janakirama-Rao | 65/32 |
| 4,314,031 | 2/1982 | Sanford et al. | 501/44 |
| 4,820,326 | 4/1989 | Speit | 65/30.11 |
| 5,089,446 | 2/1992 | Cornelius et al. | 501/15 |

FOREIGN PATENT DOCUMENTS

| | | |
|---|---|---|
| 2 484 394 | 12/1981 | France . |
| 874684 | 10/1981 | U.S.S.R. . |

OTHER PUBLICATIONS

Volf, Milos B., Chemical Approach to Glass, Halogens, pp. 562–577, 1984.

Chemical Abstracts, vol. 110, No. 13, Jun. 26, 1989, AN 236150, JP–A–63 303 808.

Database WPI, Derwent Publications, AN 90032438, JP–A–1 308 844, Dec. 13, 1989.

Database WPI, Derwent Publications, AN 92–189139, JP–A–4 124 045, Apr. 24, 1992.

Database WPI, Derwent Publications, AN 91–284669, JP–A–3 187–945, Aug. 15–1991.

*Primary Examiner*—Laura Edwards
*Assistant Examiner*—Sean Vincent
*Attorney, Agent, or Firm*—Oblon, Spivak, McClelland, Maier & Neustadt, P.C.

[57] ABSTRACT

A process for producing a glass melt by heating stock for glass comprising as the main ingredients oxides from which oxide glasses are to be formed into a melt, characterized in that said ingredients are formed into a homogeneous melt in the presence of a halide of a cation selected from the group consisting of hydrogen, lithium, sodium, potassium, magnesium, calcium and ammonium whereby the melting takes place at a lower temperature than that required with no addition of the specific halide.

8 Claims, No Drawings

PROCESS FOR PRODUCING A GLASS MELT

BACKGROUND OF THE INVENTION

1. Field of the Art

The present invention relates to a process for producing a glass melt by melting raw materials for glass, namely starting materials for forming glass, for oxide glasses, and particularly to a process for obtaining oxide glasses wherein it would ordinarily be impossible or difficult to form a homogeneous melt of raw materials for glass at a relatively low temperature.

2. Background Art

When glasses are classified on the basis of their melting points, they include a glass belonging to a classification of a low melting glass, which has a glass melting point of 1,000° C. or less. They also include a glass classified in the so-called ultra low melting glass, which includes a glass having a melting point of 500° C. or less.

In general, this ultra low melting glass contains a fluoride or a chloride as a starting material. For instance, Japanese Patent Laid-Open Publication No 187945/1991 discloses super low melting glasses of a $ZnCl_2$—$P_2O_5$—X family, wherein X represents PbO, $PbF_2$, $PbCl_2$, $AlF_3$ or the like. Japanese Patent Laid-Open Publication No. 124045/1992 also discloses additional ultra low melting glasses of $P_2O_5$—$SnCl_2$—PbO, $P_2O_5$—$SnCl_2$—$PbCl_2$, $P_2O_5$—$SnCl_2$—$PbF_2$, and $P_2O_5$—$SnCl_2$—$AlF_3$ glasses. Furthermore, U.S. Pat. No. 4,314,031 discloses glasses in $P_2O_5$—$SnF_2$—Y and $P_2O_5$—SnO—Y glasses, wherein Y represents MO or MF, and M represents a metal such as Pb, Fe, Ti, Zr, Ba or Zn. It is believed that the starting raw materials in these glasses also have a low melting temperature.

The raw materials for glass described in these publications can be considered to have a feature in that a metal-containing ingredient is in halide form, which has a melting point lower than that of the corresponding oxide and thus can be easily formed into a melt in the production of glasses. Moreover, the halogen ingredients which have remained in these glasses have an effect of lowering the glass transformation point Tg, which can be lowered to for example to 200° C. or less. These glasses have also a high resistance to chemicals.

It is believed that in the low melting glasses in these prior inventions, metals provided as halides, such as Sn and Pb, are incorporated into the glass network structure principally formed with $P_2O_5$, and that halogen atoms supported by these metal atoms are also retained within the network structure.

The halides used as the glass materials, however, tend to vaporize themselves during the melting process even at a low temperature, so that it may be difficult to control exactly the amount of the halogen in a glass produced or the glass transformation point even under the precisely adjusted production conditions.

Glasses are alternatively classified on the basis of raw materials used in (a) oxide glasses such as a silicate glass, a borate glass or a phosphate glass and (b) non-oxide glasses.

The oxide glasses are generally produced by forming a melt of raw materials for glass mainly comprising oxides, but the melt must be formed generally at a high temperature because of a high melting point of the oxides used. In addition, some kinds of or combinations of the oxides do not form a melt at a low temperature or at a practical melting temperature (See Comparative Examples below).

More particularly, the oxide glasses generally have a melting temperature in the range of 1,000° to 1,500° C., and the oxide glasses such as $P_2O_5$—$Al_3O_2$—$B_2O_3$, $SiO_2$, ZnO, and PbO glasses, for example, have a melting temperature in the range of 1,200° to 1,300° C. Among the oxide glasses, those having a relatively low melting point, such as PbO—ZnO—$B_2O_3$, PbO—$B_2O_3$—$SiO_2$, and $P_2O_5$—PbO glasses have also a high melting point in the range of 500° to 800° C., as described in detail in publications such as "FOR THE PERSONS WHO TRY TO PRODUCE GLASSES FOR THE FIRST TIME", published in Japanese by Uchida Rokakuho (1989). There are thus problems in these oxide glasses that the vaporization of a part of ingredients during melting glass takes place resulting in instability in the quality of the glass products produced.

When SnO or PbO is employed as a raw material, it may easily be oxidized into $SnO_2$, $PbO_2$ or compounds thereof which may easily deposit during melting, so that it would be very difficult to produce a homogeneously molten transparent glass. Even if these materials are melted at a temperature lower than their oxidizing temperature to avoid oxidation, SnO or PbO can react with phosphorus oxide to produce a compound which would not form a homogeneous melt and thus it would be impossible to produce glass.

Thus, it is advantageous to lower the melt forming temperature of raw materials for oxide glasses.

The present invention intends to produce these oxide glasses in which a material for accelerating the melting of a solid phase is incorporated in a molten glass fluid to prepare a homogeneous transparent glass melt at a lower temperature.

SUMMARY OF THE INVENTION

The object of present invention is to make it possible to form at a lower temperature a homogeneous transparent glass melt when raw materials for oxide glasses are heated into a melt by incorporating a restricted group of halides into the raw materials thereby accelerating the melting of a solid phase into a molten glass fluid.

The present invention thus provides an improved process for producing a glass melt wherein raw materials for glass comprising as the main ingredients oxides for forming an oxide glass are heated into a melt, the improvement comprising said raw materials being formed into a homogeneous melt in the presence of a halide of a cation selected from the group consisting of hydrogen, lithium, sodium, potassium, magnesium, calcium and ammonium, whereby the melting temperature is lowered.

According to the process of the present invention, it is also possible to prepare a homogeneous transparent glass with a composition which would not be melted homogeneously. Furthermore, when the ingredients of the raw materials become unstable due to the vaporization of a part of the ingredients during the melting process at a high temperature, these ingredients can be melted at a relatively low temperature according to the process of the present invention, so that the quality of a melt is stabilized by the decreased vaporization. In addition, a homogeneous glass can be formed according to the process of the present invention and thus the surface of the glass can also be uniform with no sites vulnerable to attack, so that the glass formed has an improved resistance to chemicals and the glass transformation point can also be lowered by increasing the amount of vaporizable halogens to be retained.

The advantages inherent in the use of the specific halide according to the present invention should be regarded as unexpected in view of the fact that the advantages obtainable by the use of the specific halide in forming a melt of the raw materials would not be found when a conventional halide such as $PbCl_2$ or $SnCl_2$ is used (see Examples below).

DETAILED DESCRIPTION OF PREFERRED EMBODIMENT OF THE INVENTION

<Oxide glass>

Oxide glasses to which the process of the present invention is applied are well known in the art and described in detail in publications such as the one loc. cit. and others such as for example "Glass Handbook", published by Asakura-Shoten, Japan and Glass Science and Technology 10, "Technical Approach to Glass", published by Elsevier, the Netherlands.

Typical oxide glasses include a silicate glass, a borate glass and a phosphate glass, and these are specific examples of the oxide glasses in the present invention as well.

Oxide glasses such as these are generally represented as the ones whose principal ingredients are oxides such as $SiO_2$, $P_2O_5$, SnO, PbO, ZnO, $Al_2O_3$ and $B_2O_3$. In this connection, it should be understood that these expressions of ingredients follow the way of indication currently used for expressing a composition of a glass, and ingredients such as those indicated as $P_2O_5$ and the like do not necessarily represent the state in the glass.

The present invention relates to a process for forming a melt by heating raw materials for glass comprising, as principal ingredients, oxides which are to form oxide glasses and the phraseology "raw materials for glass comprising, as principal ingredients, oxides which are to form oxide glasses" should be understood to include, in addition to ingredients in the form of an oxide such as SnO, PbO, $Al_2O_3$ and $B_2O_3$, those which are not in the form of an oxide such as $P_2O_5$ but in the form of its precursor compound which can be converted into an oxide in the process of the melting such as an ammonium phosphate, particularly in the form of $NH_4H_2PO_4$, or orthophosphoric acid. Typical raw materials for the oxide glass of the present invention include $NH_4H_2PO_4$, $H_3PO_4$ (orthophosphoric acid), $SiO_2$, SnO, PbO, ZnO, $Al_2O_3$, $B_2O_3$, and the like.

It is within the scope of the present invention that the glass is produced with materials other than oxides in combination with the oxides insofar as these materials do not impair the advantages inherent in the present invention. For instance, while production of glasses comprising the oxides as the main ingredients and a small amount of a metal halide such as $PbCl_2$, $ZnCl_2$ or $SnF_2$ known as raw materials for non-oxide glasses may have a problem since it may be impossible or difficult to form a homogeneous melt, formation of the melt may be feasible when a specific halide according to the present invention is used. Thus, the advantages inherent in the present invention are obtainable even when the raw materials for glass contain those for non-oxide glasses, the content of which should, however, be no higher than 50 mol %, preferably no higher than 30 mol %.

Also, the raw materials for glass used in the present invention may, when desired, contain raw materials for glass which has already been vitrified through melting such as glass cullets in an appropriate amount, preferably no higher than 60% by weight. In this case, glass cullets are preferably themselves of an oxide glass.

Furthermore, the raw materials for glass in the present invention may, when desired, contain a variety of additives conventionally used in the glass making such as a coloring agent and the like.

<Halide>

The halide used in the present invention is a halide of a cation selected from the group consisting of hydrogen, lithium, sodium, potassium, magnesium, calcium and ammonium. While the cation may, when desired, be hydrogen, the halide in this case, i.e. hydrogen halide, is a gas at ordinary temperature or highly corrosive, so that it may be better to use a metal or ammonium halide. The cation includes preferably sodium, calcium and ammonium, particularly ammonium. As halogens to form the halides, on the other hand, fluorine, chlorine, bromine and iodine are generally suitable, but chlorine and fluorine are preferable. Preferred halides in the present invention may thus include sodium chloride, sodium fluoride, calcium chloride, calcium fluoride, ammonium chloride and ammonium fluoride, among which $NH_4Cl$ and $NH_4F$ are more preferred.

These halide compounds are incorporated simultaneously or sequentially into the raw materials for glass so as to be present together with the raw materials in the melt forming step of the raw materials, preferably prior to the melt formation. The gaseous halide will, when such is used, be blown into the raw materials used during the melt forming process. The quantity of the halide incorporated depends on production scales or melting temperature conditions, and is preferably in the range of 5 to 50% by weight with respect to the raw materials used.

<Melt formation>

The production of a glass melt according to the present invention is essentially the same as the conventional production of a melt or a molten fluid of glasses, particularly oxide glasses, except for the modification that a particular halide is combined with raw materials for glass in the process of melting raw materials.

Heating temperature, which may depend on the raw materials used, is generally in the range of 1,000°–1,300° C., preferably 1,000°–1,100° C. when a borate glass and a phosphate glass are employed as the oxide glass. The heating temperature is generally in the range of 1,200°–1,500° C., preferably 1,200°–1,400° C. in the case of a silicate glass. It may be presumed that when the halide is ammonium chloride which is a representative example in the present invention is used, it undergoes sublimation at 337.8° C. and vaporizes from a glass melt, and the halogen, Cl, is likely to act upon the still undissolved materials in the stock for glass used and/or compounds produced therefrom during the melting to dissolve them into the melt, whereby formation of homogeneous melt may be made possible at a lower temperature without the heating of the compounds in the stock for glass used up to their inherent melting points. It is, however, to be understood that the present invention is not influenced by the presumption.

The present invention is further described in detail with the following examples, but it should be understood that these examples do not limit the present invention.

Comparative Example 1A $NH_4H_2PO_4$, SnO and PbO in an amount of 50 g per batch were blended so as to obtain a glass product having the following composition:

| | |
|---|---|
| $P_2O_5$ | 40 mole % |
| SnO | 40 mole % |
| PbO | 20 mole %. |

The blend of the raw materials was melted in an alumina crucible at 450° C., but produced a white compound without homogeneous melt formation.

Comparative Example 1B $NH_4H_2PO_4$, $SnCl_2$ and $PbCl_2$ in an amount of 50 g per batch were blended so as to obtain a glass product having the following composition:

| | |
|---|---|
| $P_2O_5$ | 40 mole %, |
| $SnCl_2$ | 40 mole %, |
| $PbCl_2$ | 20 mole %. |

The blend of the raw materials was melted in an alumina crucible at 450° C. for 30 minutes and then cast on a carbon plate to obtain a colorless transparent glass. On observing the glass through an optical microscope, a small amount of microcrystalline deposits was detected.

Comparative Example 1C

A colorless transparent glass was produced in the same manner as in Comparative Example 1B except that the melting period of 60 minutes was employed. On observing the glass through an optical microscope, a small amount of microcrystalline deposits was detected.

Comparative Example 1D

A colorless transparent glass was produced in the same manner as in Comparative Example 1B except that the experiment was carried out in a scale of 9,000 g per batch and the melting period of 540 minutes was employed. On observing the glass through an optical microscope, a small amount of microcrystalline deposits was detected.

Example 1A–1H

Colorless transparent glasses were obtained with a material blend having the same composition as in Comparative Example 1A under a variety of conditions listed in Table 1. On incorporating $NH_4Cl$ into the material blend, the amount of a microcrystalline product deposited was decreased, and when $NH_4Cl$ was incorporated in an amount of 10 g or more in relation to a batch of 50 g, no deposit was observed and a homogeneous melt was successfully obtained.

Comparative Example 2

$NH_4H_2PO_4$ and SnO in an amount of 50 g per batch were blended so as to obtain a glass product having the following composition:

| | |
|---|---|
| $P_2O_5$ | 40 mole %, |
| SnO | 60 mole %. |

The blend of the raw materials was melted in an alumina crucible at 450° C., but produced a white compound without homogeneous melt formation.

Example 2A–2H

Colorless transparent glasses were obtained with a material blend having the same composition as in Comparative Example 2 under a variety of conditions listed in Table 2. On incorporating $NH_4Cl$ into the material blend, the amount of a microcrystalline product deposited was decreased, and when $NH_4Cl$ was incorporated in an amount of 10 g or more in relation to a batch of 50 g, no deposit was observed and a homogeneous melt was successfully obtained.

Example 3A–3C

Glasses were produced with various compositions listed in Table 3. In these case, no deposit was also observed in glasses into which $NH_4Cl$ was incorporated.

Example 4A–4C

Colorless transparent glasses were obtained with a material blend having the same composition as in Comparative Example 1A under a variety of conditions listed in Table 4. On incorporating $NH_4F$ into the material blend, the amount of a microcrystalline product deposited was decreased, and when $NH_4F$ was incorporated in an amount of 10 g or more in relation to a batch of 50 g, no deposit was observed.

Example 5A–5C

Colorless transparent glasses were obtained with a material blend having the same composition as in Comparative Example 1A under a variety of conditions listed in Table 5. On incorporating NaCl into the material blend, the amount of a microcrystalline product deposited was decreased, and when NaCl was incorporated in an amount of 10 g or more in relation to a batch of 50 g, no deposit was observed.

Example 6A–6C

Colorless transparent glasses were obtained with a material blend having the same composition as in Comparative Example 1A under a variety of conditions listed in Table 6. On incorporating $CaCl_2$ into the material blend, the amount of a microcrystalline product deposited was decreased, and when $CaCl_2$ was incorporated in an amount of 10 g or more in relation to a batch of 50 g, no deposit was observed.

Example 7A–7C

Colorless transparent glasses were obtained with a material blend having the same composition as in Comparative Example 1A under a variety of conditions listed in Table 7. On incorporating NaF into the material blend, the amount of a microcrystalline product deposited was decreased, and when NaF was incorporated in an amount of 10 g or more in relation to a batch of 50 g, no deposit was observed.

Example 8A–8C

Colorless transparent glasses were obtained with a material blend having the same composition as in Comparative Example 1A under a variety of conditions listed in Table 8. On incorporating $CaF_2$ into the material blend, the amount of a microcrystalline product deposited was decreased, and when $CaF_2$ was incorporated in an amount of 10 g or more in relation to a batch of 50 g, no deposit was observed.

TABLE 1

| | P$_2$O$_5$ | SnO | SnCl$_2$ | PbO | PbCl$_2$ | ZnO | ZnCl$_2$ | Material batch (g) | NH$_4$Cl (g) | Glass melt formation* | Microcrystals | Melting period (min) | Tg (°C.) |
|---|---|---|---|---|---|---|---|---|---|---|---|---|---|
| Comparative Example 1A | 40 | 40 | — | 20 | — | — | — | 50 | 0 | X | — | 30 | — |
| Example 1A | 40 | 40 | — | 20 | — | — | — | 50 | 5 | ○ | detected | 30 | 124 |
| Example 1B | 40 | 40 | — | 20 | — | — | — | 50 | 10 | ○ | not detected | 30 | 120 |
| Example 1C | 40 | 40 | — | 20 | — | — | — | 50 | 15 | ○ | not detected | 30 | 116 |
| Example 1D | 40 | 40 | — | 20 | — | — | — | 50 | 15 | ○ | not detected | 100 | 208 |
| Example 1E | 40 | 40 | — | 20 | — | — | — | 100 | 40 | ○ | not detected | 95 | 124 |
| Example 1F | 40 | 40 | — | 20 | — | — | — | 100 | 40 | ○ | not detected | 150 | 177 |
| Example 1G | 40 | 40 | — | 20 | — | — | — | 4000 | 1600 | ○ | not detected | 360 | 106 |
| Example 1H | 40 | 40 | — | 20 | — | — | — | 4000 | 1600 | ○ | not detected | 620 | 155 |
| Comparative Example 1B | 40 | — | 40 | — | 20 | — | — | 50 | 0 | ○ | small amount | 30 | 161 |
| Comparative Example 1C | 40 | — | 40 | — | 20 | — | — | 50 | 0 | ○ | small amount | 60 | 206 |
| Comparative Example 1D | 40 | — | 40 | — | 20 | — | — | 9000 | 0 | ○ | detected | 540 | 223 |

*X: No  ○: Yes

TABLE 2

| | P$_2$O$_5$ | SnO | SnCl$_2$ | PbO | PbCl$_2$ | ZnO | ZnCl$_2$ | Material batch (g) | NH$_4$Cl (g) | Glass melt formation | Microcrystals | Melting period (min) | Tg (°C.) |
|---|---|---|---|---|---|---|---|---|---|---|---|---|---|
| Comparative Example 2 | 40 | 60 | — | — | — | — | — | 50 | 0 | X | — | 30 | — |
| Example 2A | 40 | 60 | — | — | — | — | — | 50 | 10 | ○ | not detected | 30 | 117 |
| Example 2B | 40 | 60 | — | — | — | — | — | 50 | 15 | ○ | not detected | 30 | 111 |
| Example 2C | 40 | 60 | — | — | — | — | — | 50 | 10 | ○ | not detected | 90 | 190 |
| Example 2D | 40 | 60 | — | — | — | — | — | 50 | 15 | ○ | not detected | 90 | 191 |
| Example 2E | 40 | 60 | — | — | — | — | — | 100 | 40 | ○ | not detected | 90 | 177 |
| Example 2F | 40 | 60 | — | — | — | — | — | 100 | 40 | ○ | not detected | 150 | 175 |
| Example 2G | 40 | 60 | — | — | — | — | — | 4000 | 1600 | ○ | not detected | 400 | 103 |
| Example 2H | 40 | 60 | — | — | — | — | — | 4000 | 1600 | ○ | not detected | 735 | 164 |

TABLE 3

| | P$_2$O$_5$ | SnO | SnCl$_2$ | PbO | PbCl$_2$ | ZnO | ZnCl$_2$ | Material batch (g) | NH$_4$Cl (g) | Glass melt formation | Microcrystals | Melting period (min) | Tg (°C.) |
|---|---|---|---|---|---|---|---|---|---|---|---|---|---|
| Example 3A | 35 | 63 | — | — | — | — | — | 50 | 15 | ○ | not detected | 30 | 140 |
| Example 3B | 50 | — | — | — | — | 50 | — | 50 | 20 | ○ | not detected | 30 | 163 |
| Example 3C | 50 | — | — | — | — | 50 | — | 50 | 20 | ○ | not detected | 85 | 212 |

TABLE 4

| | P$_2$O$_5$ | SnO | SnCl$_2$ | PbO | PbCl$_2$ | ZnO | ZnCl$_2$ | Material batch (g) | NH$_4$F (g) | Glass melt formation | Microcrystals |
|---|---|---|---|---|---|---|---|---|---|---|---|
| Example 4A | 40 | 40 | — | 20 | — | — | — | 50 | 5 | ○ | small amount |
| Example 4B | 40 | 40 | — | 20 | — | — | — | 50 | 10 | ○ | not detected |
| Example 4C | 40 | 40 | — | 20 | — | — | — | 50 | 15 | ○ | not detected |

TABLE 5

|  | $P_2O_5$ | SnO | $SnCl_2$ | PbO | $PbCl_2$ | ZnO | $ZnCl_2$ | Material batch (g) | NaCl (g) | Glass melt formation | Microcrystals |
| --- | --- | --- | --- | --- | --- | --- | --- | --- | --- | --- | --- |
| Example 5A | 40 | 40 | — | 20 | — | — | — | 50 | 5 | ◯ | small amount |
| Example 5B | 40 | 40 | — | 20 | — | — | — | 50 | 10 | ◯ | not detected |
| Example 5C | 40 | 40 | — | 20 | — | — | — | 50 | 15 | ◯ | not detected |

TABLE 6

|  | $P_2O_5$ | SnO | $SnCl_2$ | PbO | $PbCl_2$ | ZnO | $ZnCl_2$ | Material batch (g) | $CaCl_2$ (g) | Glass melt formation | Microcrystals |
| --- | --- | --- | --- | --- | --- | --- | --- | --- | --- | --- | --- |
| Example 6A | 40 | 40 | — | 20 | — | — | — | 50 | 5 | ◯ | small amount |
| Example 6B | 40 | 40 | — | 20 | — | — | — | 50 | 10 | ◯ | not detected |
| Example 6C | 40 | 40 | — | 20 | — | — | — | 50 | 15 | ◯ | not detected |

TABLE 7

|  | $P_2O_5$ | SnO | $SnCl_2$ | PbO | $PbCl_2$ | ZnO | $ZnCl_2$ | Material batch (g) | NaF (g) | Glass melt formation | Microcrystals |
| --- | --- | --- | --- | --- | --- | --- | --- | --- | --- | --- | --- |
| Example 7A | 40 | 40 | — | 20 | — | — | — | 50 | 5 | ◯ | small amount |
| Example 7B | 40 | 40 | — | 20 | — | — | — | 50 | 10 | ◯ | not detected |
| Example 7C | 40 | 40 | — | 20 | — | — | — | 50 | 15 | ◯ | not detected |

TABLE 8

|  | $P_2O_5$ | SnO | $SnCl_2$ | PbO | $PbCl_2$ | ZnO | $ZnCl_2$ | Material batch (g) | $CaF_2$ (g) | Glass melt formation | Microcrystals |
| --- | --- | --- | --- | --- | --- | --- | --- | --- | --- | --- | --- |
| Example 8A | 40 | 40 | — | 20 | — | — | — | 50 | 5 | ◯ | small amount |
| Example 8B | 40 | 40 | — | 20 | — | — | — | 50 | 10 | ◯ | not detected |
| Example 8C | 40 | 40 | — | 20 | — | — | — | 50 | 15 | ◯ | not detected |

What is claimed is:

1. In a process for producing a glass melt which comprises heating raw materials for glass comprising as the main ingredients oxides for forming an oxide glass into a melt, the improvement which comprises heating said raw materials for glass in the presence of an ammonium halide selected from the group consisting of ammonium chloride and ammonium fluoride, whereby the melting temperature is lowered to form a homogeneous melt.

2. The process for producing a glass melt according to claim 1, wherein said halide is $NH_4Cl$.

3. The process for producing a glass melt according to claim 1, wherein said oxide glass is a $P_2O_5$—MO glass, wherein M represents at least one metal selected from the group consisting of Sn, Zn and Pb.

4. The process for producing a glass melt according to claim 1, wherein said raw materials for glass comprises, in an amount no higher than 60% by weight, raw materials for glass which have been vitrified.

5. The process for producing a glass melt according to claim 4 wherein said raw materials for glass which have been vitrified is an oxide glass.

6. The process for producing a glass melt according to claim 1, wherein said raw materials for glass comprise a compound selected from the group consisting of $SiO_2$, SnO, PbO, ZnO, $Al_2O_3$ and $B_2O_3$.

7. The process for producing a glass melt according to claim 1, wherein said raw materials for glass comprise raw materials for a non-oxide glass in an amount no higher than 30% by mole.

8. The process for producing a glass melt according to claim 1, wherein said halide is present in an amount of 5 to 50% by weight with respect to said raw materials for glass.

* * * * *